Jan. 25, 1966 A. W. BAILEY 3,231,817
FIXTURE FOR TESTING POLYPHASE STATOR WINDINGS OF ALTERNATORS
AND THE LIKE FOR OPENS, SHORTS, AND PHASE REVERSALS
Filed May 24, 1961 2 Sheets-Sheet 1

Arthur W. Bailey
INVENTOR.

BY
Attorneys

Jan. 25, 1966    A. W. BAILEY    3,231,817
FIXTURE FOR TESTING POLYPHASE STATOR WINDINGS OF ALTERNATORS
AND THE LIKE FOR OPENS, SHORTS, AND PHASE REVERSALS
Filed May 24, 1961    2 Sheets-Sheet 2

Arthur W. Bailey
INVENTOR.

BY *Clarence A. O'Brien*
*and Harvey B. Jacobson*
Attorneys

United States Patent Office 3,231,817
Patented Jan. 25, 1966

3,231,817
FIXTURE FOR TESTING POLYPHASE STATOR
WINDINGS OF ALTERNATORS AND THE LIKE
FOR OPENS, SHORTS, AND PHASE REVERSALS
Arthur W. Bailey, San Diego, Calif., assignor to
George Davis, San Diego, Calif.
Filed May 24, 1961, Ser. No. 112,354
6 Claims. (Cl. 324—158)

This invention relates to apparatus for testing stator assemblies and more particularly to the testing of polyphase stator windings of alternators currently used for automotive electric generators.

The apparatus of the present invention therefore provides a rapid and convenient method for testing stator assemblies of alternators prior to assembly of the stators. The testing apparatus is particularly useful because of its ability to provide a comparison of the current measurement in the three phases of the stator winding whereby any open, shorted or reverse phase connection may be detected. Accordingly, the testing apparatus of the present invention will enable one to determine whether the alternator stator is in satisfactory working condition prior to assembly thereof within the alternator unit. It is therefore a primary object of the present invention to provide a tester which is capable of providing a comparative test of the various phase windings in a polyphase winding assembly.

Another object of this invention is to provide a stator winding tester which is particularly useful because of its ability to receive the stator assembly of alternators and selectively orientate the stator in order to obtain current readings within each of the phase portions of the winding, in a more rapid and accurate manner.

A further object of this invention is to provide a tester for polyphase stator assemblies which requires a minimum of effort and time in order to perform a complete test of the stator winding.

In accordance with the foregoing objects, the tester of the present invention includes a base on which a primary coil assembly is fixedly mounted in vertical position and is connected to a source of A.C. line current. The stator assembly is positioned on a movable platform which is rotatable with respect to the fixed primary coil assembly in order to orientate the stator assembly for obtaining current measurement in the various phase portions of the winding. A pair of pole members is therefore provided with interfitting pole fingers circumferentially spaced about the fixed primary coil assembly so as to provide a plurality of magnetic flux path cooperating with the plural winding coils of the stator assembly in order to induce therein current for testing purposes. The stator by being mounted on the movable platform may therefore be angularly orientated with respect to the fixedly positioned pole members on the core members in order to induce the current in a selected phase portion of the stator winding. The movable platform is therefore provided with a pointer which cooperates with phase indicating indicia on the base in order to indicate the phase of the winding in which current is induced by the primary coil assembly. The tester is therefore also provided with a meter or meters which may be connected to the particular phase in which the current is induced by test leads. In one form of the invention, a single meter is utilized with a three position switch by virtue of which the meter is connected to the proper test lead which have been attached to the different phase terminals of the stator assembly being tested. In another form of tester, a plurality of meters may be provided each connected to a different pair of test leads. The tester is also provided with voltage indicating lamps connected across the meters and the A.C. power line to the primary coil assembly respectively.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
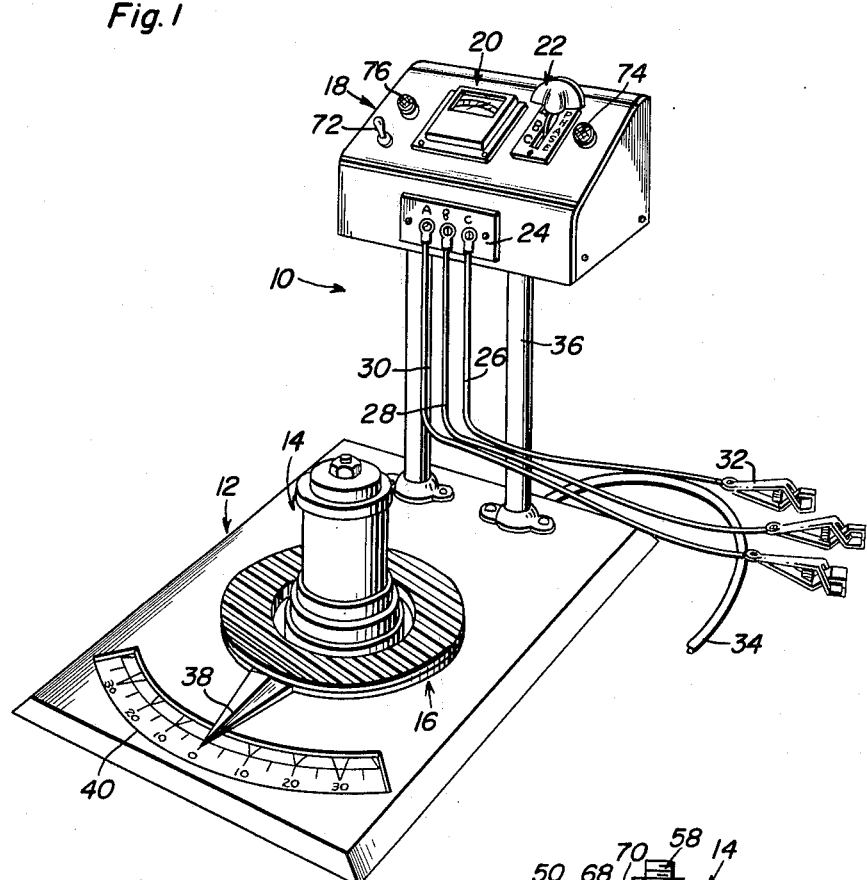
FIGURE 1 is a perspective view of one form of tester made in accordance with the present invention.

Referring now to the drawings in detail, it will be observed from FIGURE 1 that the tester which is generally referred to by reference numeral 10 consists primarily of a base or mounting 12 upon which there is mounted in vertically fixed relation, a primary coil assembly 14, a movable platform member 16 and a control assembly 18 which includes the induced current measuring meter 20 and a three-position phase selector switch 22. The control assembly 18 is further provided with a terminal plate 24 to which a plurality of tester leads 26, 28 and 30 are connected having at their other ends terminal clips 32 by means of which the test leads may be connected to the phase terminals of the stator assembly being tested. The primary coil assembly 14 is connected to a source of power, preferably a sixty cycle, 110 volts A.C. current source through the power cable 34. The control assembly 18 is conveniently mounted in spaced relation to the primary coil assembly 14 by means of a pair of post members 36. Finally, the movable platform member 16 by means of which the stator assembly tested may be orientated with respect to the primary coil assembly 14, is provided with a pointer 38 which cooperates with phase indicating indicia 40 mounted on the base 12.

Figure 2:
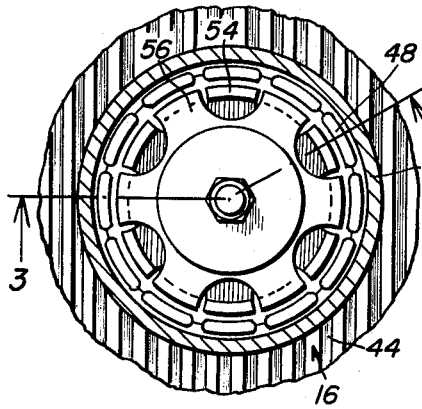
FIGURE 2 is a partial top plan view of the tester with a stator assembly mounted thereon for testing purposes.
Figure 3:
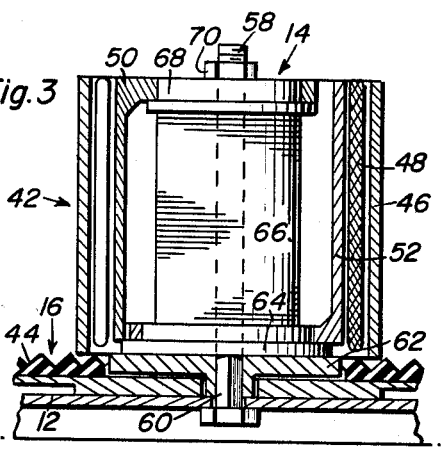
FIGURE 3 is a partial sectional view taken through a plane indicated by section line 3—3 in FIGURE 2.
Figure 4:
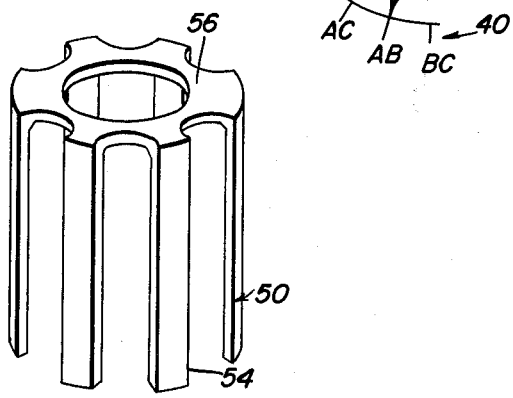
FIGURE 4 is a perspective view of one of the magnetic core members as shown in FIGURES 2 and 3.

Referring now to FIGURES 2, 3 and 4 in particular, the mounting of a stator assembly on the platform member 16 in inductive relation to the primary coil assembly 14, will become apparent. It will be observed from FIGURES 2 and 3, that the stator assembly to be tested which is generally referred to by reference numeral 42 is mounted on the platform member 16 which includes a roughened surface 44 formed in any suitable manner as by the grooves as illustrated in order to grip the lower end of the stator assembly 42 so that it may move or rotate with the platform member 16 when seated thereupon. The stator assembly 42 may be of any type and generally includes an outer stator frame 46 which supports a plurality of stator winding coils 48, twelve of which are shown in the particular exemplary illustration of FIGURE 2. The phase terminals of the stator assembly (not shown) are connected to the control assembly through the test leads by clipping the clip elements 32 thereto when the stator assembly 42 is installed on the movable platform.

The stator assembly 42 is maintained in spaced relation to the primary coil assemblies 14 by a pair of removable pole core members 50 and 52 which may be made of laminated iron, capable of providing a magnetic flux path without developing any eddy currents therein. The pole pieces 50 and 52 are identical to each other and include a plurality of circumferentially spaced pole portions 54 which extend in an axial direction with respect to a disk portion 56 of the pole pieces. The pole piece members 50 and 52 are arranged with the pole portions 54 thereof interfitting as more clearly seen in FIGURE 2 so that alternate poles of opposite polarity will be presented in spaced relation between the coil winding 48 and the primary coil assembly 14. Accordingly, each of the pole members 50 and 52 is provided with pole members 54 which are equal in number to one-half the number of coil windings 48 of the stator assembly 42 being tested. The pole members 50 and 52 being fixedly mounted on the primary coil assembly 14 will therefore provide directed flux paths by means of which current may be induced within the coil winding 48 when power is applied to the primary coil assembly 14. By rotatably shifting the stator assembly and the coil windings 48 with respect to the fixed primary coil assembly and pole members, current may be selectively induced within different phase portions of the coil windings. The stator 46 is a standard item to be tested with the twelve coil windings 48 electrically interconnected so that every fourth winding is connected in series to form one phase group as diagrammatically shown in FIGURE 5. Since there are six pairs of poles 54 of opposite polarity, six flux paths are established so that adjacent windings are disposed in magnetic fields of opposite polarity as would be apparent to anyone skilled in the art. Accordingly, adjacent phase windings will have phase currents induced therein which oppose each other and cancel out so that the current induced in the third phase winding group being tested, will prevail as also diagrammatically shown in FIGURE 5. By angularly shifting the stator in either direction (from a position in which a resultant current is induced substantially in one phase winding group) by an amount sufficient to reverse the polarity of the poles to which each winding is exposed, the other two phase winding groups may be tested. The pointer 38 connected to the platform member 16 and the indicia 40 on the base 12 are therefore provided for such purpose. Therefore, the stator may be shifted by 30 degrees in either direction in order to reverse pole polarity in the illustrated embodiment.

The primary coil assembly is therefore fixedly mounted on the base 12 by means of a mounting bolt 58 having a squared or non-circular portion 60 at the lower end thereof for non-rotatably securing member 62 thereto. A stepped disk member 64 is mounted on the bolt 58 and receives the disk portion of the pole member 52. Mounted above the stepped disk member 64 is the primary coil 66 having a core made of laminated iron with sufficient straight winding turns of wire to produce from eight to ten amperes in the stator winding being tested. The primary coil assembly 14 may be finally assembled with an upper stepped disk member 68 on which the other pole member 50 is seated. An assembling nut 70 is therefore provided and threadedly engaged at the upper end of the bolt assembly 58.

From the foregoing description, testing of a stator assembly by the apparatus of the present invention will be apparent. The stator assembly assembled on the primary coil assembly 14 as hereinbefore indicated, may be then orientated with respect to the pole members by angular shifting of the platform member 16, the indicia 40 being arranged and calibrated to indicate the proper phase positions for the particular stator being tested. The clips 32 on the ends of the test leads may then be connected to the phase terminals of the stator assembly whereby induced current reading may be obtained through the meter 20 for the particular phase of the stator assembly orientated with respect to the primary coil assembly. The meter 20 may be operatively connected to the proper leads which are connected across the orientated phase winding, by manipulation of the phase selector switch 22. The testing procedure may then be initiated by throwing on the on-off switch 72. The pilot lights 74 and 76 will then respectively indicate the presence of voltage applied to the primary coil assembly 14 and the meter 20 respectively.

Figure 5:
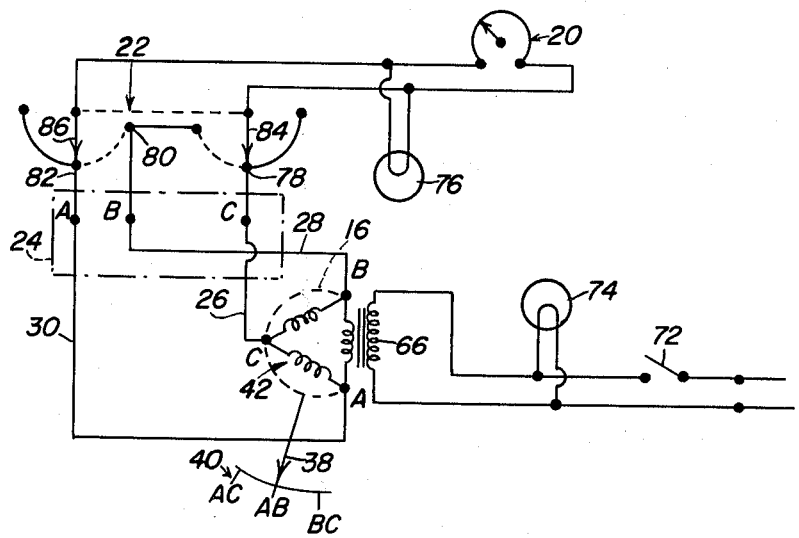
FIGURE 5 is a circuit diagram of the testing apparatus of FIGURE 1.

Referring therefore to FIGURE 5, the electrical connection of the tester 10 will be observed. Upon closing of the switch 72, 110-volt A.C., 60-cycle current will flow through the primary coil 66 of the primary coil assembly and the pilot light 74 will light up to indicate the presence of the applied voltage. The stator assembly mounted on the platform member 16 has been orientated with respect to the primary coil assembly so that current will be induced in one phase of the stator assembly as schematically indicated in FIGURE 5. The phase terminals of the stator are therefore connected by the test leads 26, 28 and 30 to the terminals 78, 80 and 82 of the switch assembly 22. The switch assembly includes a pair of interconnected switch members 84 and 86 which are simultaneously movable to engage the contacts to which the contact terminals 78, 80 and 82 are connected in order to connect the meter 20 to the different pairs of phase terminals of the stator assembly 42. Accordingly, once the stator assembly 42 has been orientated as indicated by the pointer 38 and indicia 40, the corresponding positioning of the switch 22 will connect the meter 20 across the phase terminals of the phase winding in which the current is being induced by the primary coil so that the induced current may be measured. The presence of a voltage across the meter 20 will be indicated by the pilot light 76. It will therefore be appreciated, that a rapid and accurate comparison may be made between the current induced in various phases of the stator being tested by mere repositioning of the movable platform 16 and manipulation of the selector switch 22. It will also be appreciated that the stator assembly may be so tested after a rather simple assembly of the stator on the primary coil assembly and connection of the test leads by the clips 32 to the respective phase terminals.

Figure 6:
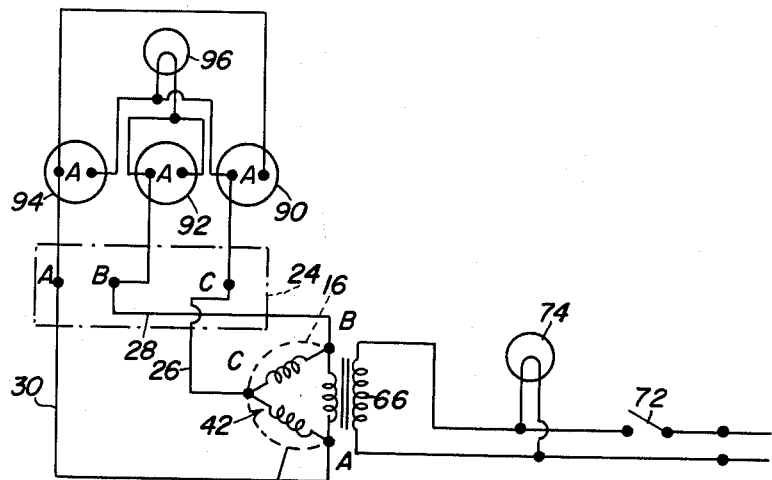
FIGURE 6 is a circuit diagram of another form of testing apparatus.

FIGURE 6 illustrates a second form of tester which is the same as the tester heretofore described, except for the use of a plurality of meters and hence the elimination of the meter selector switch 22. Accordingly, the tester of FIGURE 6, includes three meters 90, 92 and 94, the terminals of which are connected across different pairs of phase terminals to which the test leads are connected. Also, the pilot light 96 is connected into the circuit so as to indicate the presence of a voltage applied to any of the meters through which induced current flows. Operation of the tester as illustrated in FIGURE 6 is identical to that described with respect to the tester 10 the only difference being that a different meter corresponding to the phase position of the platform 16 must be read rather than the manipulation of a meter selector switch to correspond to the phase position of the platform as described with respect to the tester 10.

From the foregoing description, the utility of the present invention will be apparent. It will therefore be appreciated that the testing apparatus of the present invention provides a more rapid and complete testing of stators prior to assembly. The tester is capable of testing all types of stator windings whether single phase or polyphase. It not only provides facilities for measuring the conductivity of the winding coils but also provides an immediate comparison wherein defects may be more readily detected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tester for a polyphase multiple winding stator having a plurality of phase portions comprising base means, primary coil means connected to a source of A.C. line current and fixedly mounted in vertical position on said base means, platform means movably mounted on the base means carrying the stator for movement relative to the primary coil means, magnetic core means for establishing directed magnetic flux paths between the stator and the primary coil means, means removably mounting the core means on the primary coil means for uniform spacing of the stator therefrom, meter means electrically connected across the phase portions of the stator for measuring current induced in those phase portions inductively orientated with respect to the primary coil means, selector means connected to the platform means for displacing the stator carried thereon to inductively orientate the respective phase portions, and indicator means mounted on the base means for indicating the respective orientated base portions being measured by the meter means, said platform means comprising a rotatable disk member having a surface which is roughened as compared to the base means for gripping a lower axial end of the stator, said core means comprising a pair of pole members interfitted with each other to form alternate circumferentially spaced magnetic poles of opposite polarity equal in number to the windings of the stator.

2. The combination of claim 1, wherein the meter means includes test leads removably connected to the different phase portions of the windings on the stator.

3. The combination of claim 1, wherein said meter means includes test leads removably connected to the different phase portions of the windings on the stator, a single meter, and selector switch means for operatively connecting said meter to different pairs of test leads.

4. A tester for a polyphase multiple winding stator having a plurality of phase portions comprising base means, primary coil means connected to a source of A.C. line current and fixedly mounted in vertical position on said base means, platform means movably mounted on the base means carrying the stator for movement relative to the primary coil means, magnetic core means for establishing directed magnetic flux paths between the stator and the primary coil means, means removably mounting the core means on the pirmary coil means for uniform spacing of the stator therefrom, meter means electrically connected across the phase portions of the stator for measuring current induced in those phase portions inductively orientated with respect to the primary coil means, selector means connected to the platform means for displacing the stator carried thereon to inductively orientate the respective phase portions, and indicator means mounted on the base means for indicating the respective orientated phase portions being measured by the meter means, said core means comprises a pair of pole members interfitted with each other to form alternate circumferentially spaced magnetic poles of opposite polarity equal in number to the windings of the stator.

5. The combination of claim 4 wherein said phase selector means comprises a pointer connected to the platform means, said indicator means including movable therewith an phase indicating indicia mounted on the base means.

6. Apparatus for testing an alternator stator or the like having a plurality of winding phase portions comprising, mounting means, primary coil means connected to a source of A.C. line current and fixedly mounted on said mounting means, magnetic core means mounted on the primary coil means for uniform spacing of the stator with respect to the primary coil means and to provide directed magnetic flux therebetween, phase positioning means operatively mounted on the mounting means for selectively positioning the stator to inductively orientate the phase portions relative to the primary coil means, and meter means operatively mounted on the mounting means for selectively positioning the stator to inductively orientate the phase portions relative to the primary coil means, and meter means operatively connected to the stator for comparatively measuring current induced in each of the phase portions of the stator when inductively orientated with respect to the primary coil means, said core means comprising a pair of pole members interfitted with each other to form alternate circumferentially spaced magnetic poles of opposite polarity equal in number to the windings of the stator.

References Cited by the Examiner

UNITED STATES PATENTS

| | | | |
|---|---|---|---|
| 2,434,961 | 1/1948 | Ridley | 324—158 |
| 2,675,542 | 4/1954 | Kress | 324—158 |
| 2,726,382 | 12/1955 | Bell | 324—158 |
| 2,752,568 | 6/1956 | Ward | 324—158 |
| 2,804,594 | 8/1957 | Bjong et al. | 324—158 |
| 2,825,871 | 3/1958 | Evans | 324—158 |
| 2,890,407 | 6/1959 | Huehn et al. | 324—158 |
| 2,993,131 | 7/1961 | Trevitt | 310—86 |

WALTER L. CARLSON, *Primary Examiner.*

LLOYD McCOLLUM, *Examiner.*

G. S. KINDNESS, E. L. STOLARUN,
*Assistant Examiners.*